United States Patent [19]
Tameris

[11] Patent Number: 5,227,079
[45] Date of Patent: Jul. 13, 1993

[54] PLASTIC CHEESE MOULD WITH DRAINAGE SLITS FORMED DURING THE MANUFACTURE OF THE UPRIGHT WALL BY INJECTION MOULDING

[75] Inventor: Hendrikus M. Tameris, Rotterdam, Netherlands

[73] Assignee: Crellin B. V., Rotterdam, Netherlands

[21] Appl. No.: 788,775

[22] Filed: Nov. 6, 1991

Related U.S. Application Data

[62] Division of Ser. No. 420,555, Oct. 11, 1989, Pat. No. 5,065,671.

[30] Foreign Application Priority Data

Oct. 11, 1988 [NL] Netherlands ............... 8802492

[51] Int. Cl.$^5$ .................. A01J 25/13; A01J 25/11
[52] U.S. Cl. ................... 249/117; 99/456; 249/141; 425/84; 425/86
[58] Field of Search .......... 264/261, 157, 160; 156/304.5, 304.6; 425/84, 85, 86; 99/456, 458; 249/134, 141, 117, 127

[56] References Cited

U.S. PATENT DOCUMENTS

| | | | |
|---|---|---|---|
| 2,392,734 | 1/1946 | Haberstump | 264/261 |
| 3,370,736 | 2/1968 | Wilentchik | 156/258 |
| 3,838,955 | 10/1974 | Dubbeld | 99/458 |
| 4,083,095 | 4/1978 | Flaum et al. | 156/264 |
| 4,371,490 | 2/1983 | Geesink | 249/134 |
| 4,472,339 | 9/1984 | van der Ploeg | 249/134 |
| 4,580,961 | 4/1986 | Jensen | 425/84 |
| 4,889,480 | 12/1989 | Nakamura et al. | 425/577 |

FOREIGN PATENT DOCUMENTS

| | | |
|---|---|---|
| 2407583 | 9/1974 | Fed. Rep. of Germany. |
| 2823182 | 12/1978 | Fed. Rep. of Germany. |
| 2909960 | 10/1980 | Fed. Rep. of Germany. |
| 7302524 | 8/1974 | Netherlands. |
| 7705990 | 12/1978 | Netherlands. |
| 7900831 | 8/1980 | Netherlands ...... 2063234/071971frx |
| 2040667 | 9/1980 | United Kingdom. |

OTHER PUBLICATIONS

Randolph et al., Plastics Engineering Handbook, Reinhold, N.Y. (1960) pp. 299-304 relied on.

*Primary Examiner*—Jay H. Woo
*Assistant Examiner*—Duane S. Smith
*Attorney, Agent, or Firm*—Weintraub, DuRoss & Brady

[57] ABSTRACT

A rigid rectangular cheese mold includes a bottom and four upright walls heatsealed to each other at their edges. The walls are provided with outwardly diverging drainage slits during injection molding of the walls. The drainage slits form rows extending in the longitudinal direction of the walls, the drainage slits of one row are staggered with respect to the slits of the other row. The outer side of the cheese mold may be reinforced by reinforcing strips or a reinforcing strip-like frame. The inner surface of the wall has whey discharge recesses formed in a net structure comprising first structure ribs and second structure ribs. The first ribs extending in the vertical direction of the wall are thicker than the second ribs extending in the horizontal direction. Additional channels on the inner side of wall may connect the whey discharge recesses. The net structure is also formed during injection moulding of the walls.

5 Claims, 4 Drawing Sheets

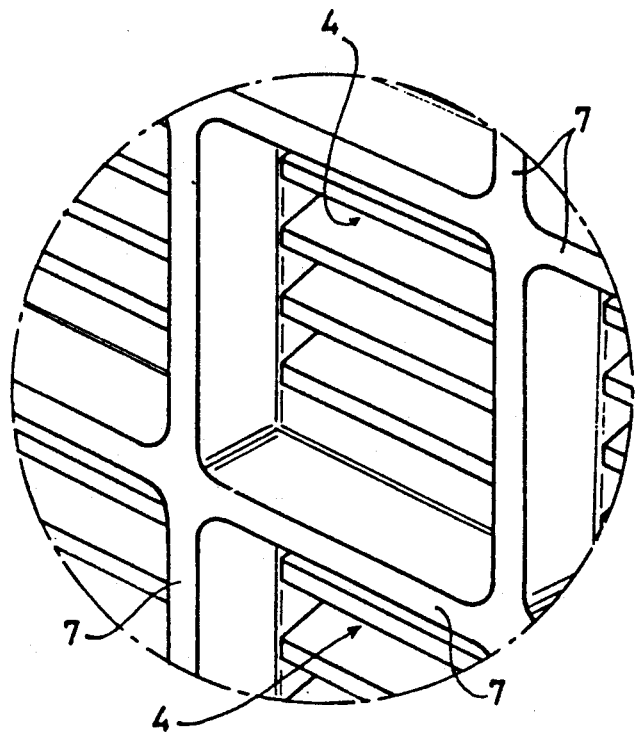
FIG:2.
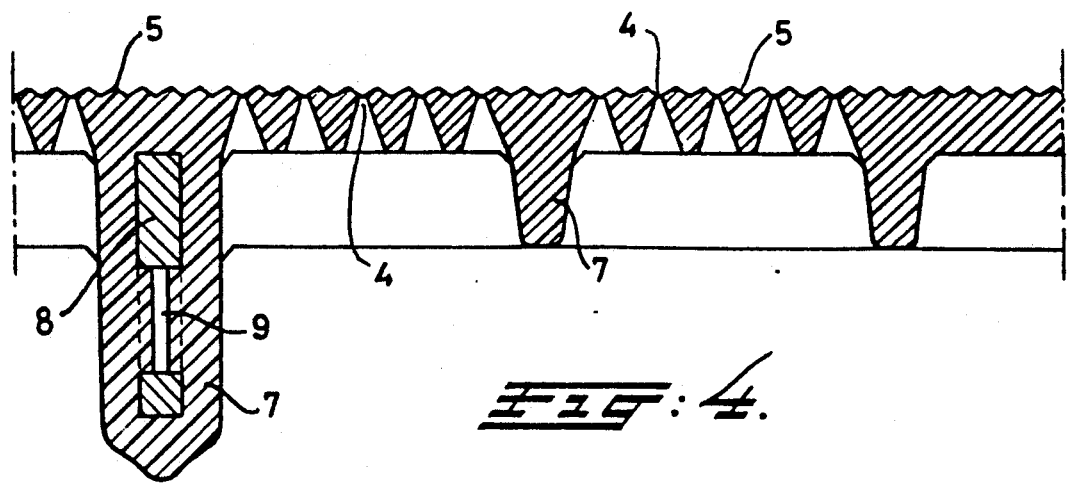
FIG:4.

PLASTIC CHEESE MOULD WITH DRAINAGE SLITS FORMED DURING THE MANUFACTURE OF THE UPRIGHT WALL BY INJECTION MOULDING

This is a division of the application Ser. No. 07/420,555, filed Oct. 11, 1989, now U.S. Pat. No. 5,065,671.

BACKGROUND OF THE INVENTION

1. Field of the Invention

The present invention relates to a substantially rigid plastic cheese mold, comprising a bottom and upright wall(s) provided with drainage slits, and also having on the inner side of the wall whey discharge recesses which open out into said drainage slits.

2. Description of the Related Art

Such a plastic cheese mold, in which the drainage slits are obtained by mechanical working of the upright wall(s) is known. Due to the mechanical working, such as milling or sawing, these drainage slits may, however, become rough on the inner side. Under those conditions it might occur that curd residues are left behind after cleaning of the cheese mold.

SUMMARY OF THE INVENTION

It is an object of the invention to provide a plastic cheese mold of the above-mentioned type in which this disadvantage does not occur.

This object is achieved according to the invention in that at least the drainage slits are formed during the production of the upright wall(s) by injection molding.

By forming the drainage slits during injection molding of the walls, very smooth edges are obtained, so that after cleaning, the plastic cheese mold will no longer contain any undesirable curd residues in which undesirable bacteria can multiply.

It is particularly advantageous for the drainage slits to diverge from the inside of the upright walls towards the outside of the walls. The drainage slit molding parts disposed in an injection molding device are consequently easy to remove after the formation of a cheese mold wall. The drainage slits are placed in rows running lengthwise on the walls, and these rows are staggered relative to each other, when viewed in the vertical direction.

A plastic cheese mold according to the invention is preferably made of polyethylene or polypropylene, more particularly of polyethylene.

The whey discharge recesses present on the inner side of the wall of such a plastic cheese mold are also formed during injection molding, these whey discharge recesses forming grooves. A major advantage is obtained in this way, since the whey discharge grooves present do not have any rough parts like known grooves which are formed by mechanical working of upright walls of a plastic cheese mold formed by injection molding.

It is particularly advantageous for the whey discharge recesses to be formed within a net structure on the inside wall, i.e., integral with the wall, thereby making it possible to give a cheese an appearance which is similar to the hitherto known cheeses formed by using a cheese mold and a plastic net detachably disposed therein. Such a net structure also ensures a very good whey discharge.

Settling of the plastic after injection molding may mean that grooves or recesses on the inside wall of the plastic cheese mold can be considerably reduced. It is therefore advisable when forming such grooves or recesses to use an injection molding form provided with groove-forming or recess-forming elevations which are of greater height than the ultimate depth of the grooves or recesses desired in the finished cheese mold.

The upright walls of the plastic cheese mold carry reinforcement ribs. These ribs rapidly absorb the forces exerted on the upright walls during the pressing of curds to cheese.

The reinforcement ribs extend parallel and/or at right angles to the bottom face of the mold and the circumference of the mold. A metal reinforcement strip may be provided in the reinforcement ribs. This reinforcement strip can be provided with through holes to ensure good anchoring of the reinforcement strip in the molten plastic of the wall during heating and subsequent solidification of the plastic. This reinforcement particularly prevents sagging of the walls during pressing of the curd.

The cheese mold can also be reinforced by means of a surrounding frame of interconnected metal strips.

A plastic cheese mold according to the invention is preferably rectangular and formed by walls which are welded together at the edges. In this way, a cheese mold can be manufactured with simple injection molds since all that is needed is an injection mold for forming upright walls. Thereafter, in a separate operation, the walls are welded to each other on the edges by mirror or ultrasonic welding. In this way, a plastic cheese mold can be made which is very resistant to the forces exerted on the upright walls during pressing of the curd to cheese.

The invention will now be explained with reference to an example of an embodiment as shown in the drawings.

BRIEF DESCRIPTION OF THE DRAWINGS

FIG. 2 is a detail of an outside of the wall of a cheese mold according to FIG. 1;

FIG. 3 is a detail of the inner side of the upright wall of a cheese mold according to FIG. 1;

DETAILED DESCRIPTION OF THE PREFERRED EMBODIMENT

Figure 1:
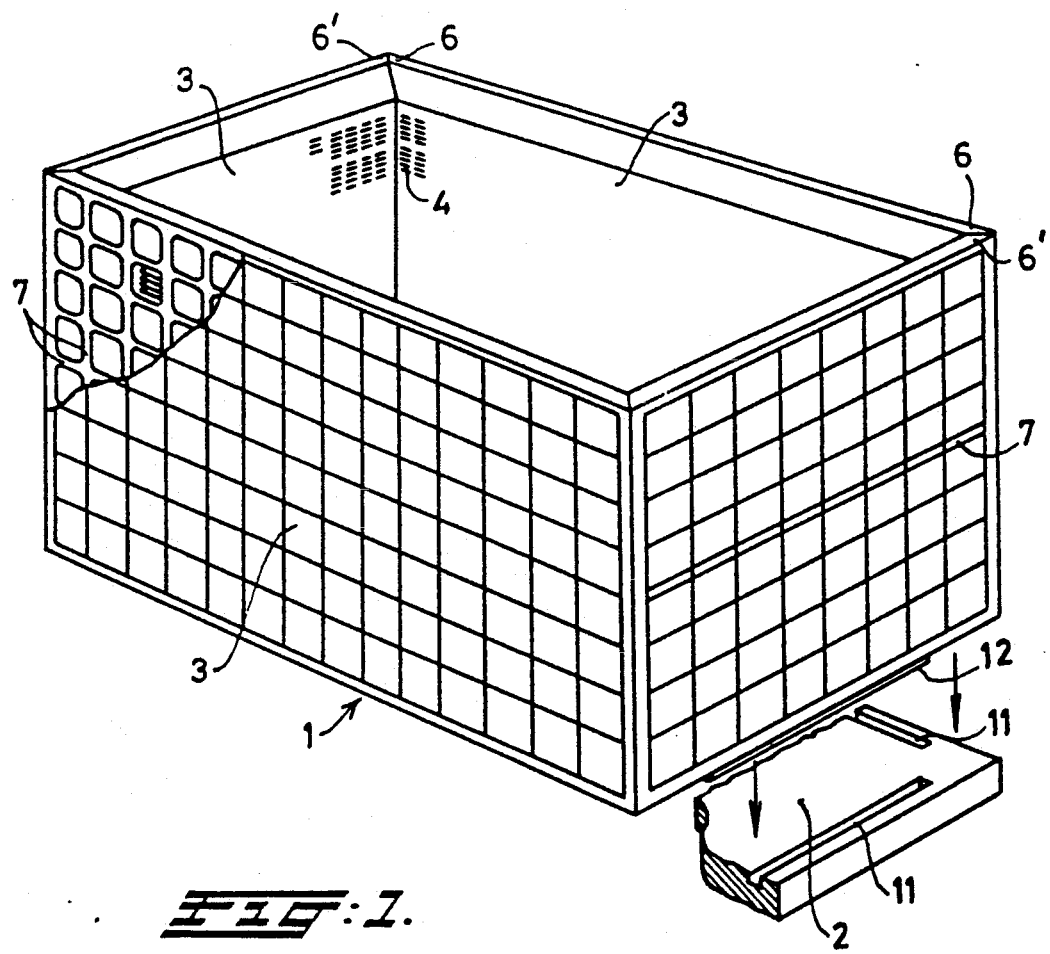
FIG. 1 shows a cheese mold according to the invention.

FIG. 1 shows a cheese mold of plastic, particularly polyethylene, comprising four upright walls 3 which together bound a rectangular cheese mold.

The upright walls 3, are joined together at their edges 6, 6', e.g. by ultrasonic welding, and thereby form a rectangular cheese mold 1. The mold 1 can be joined to a bottom 2, provided with connecting grooves 11 which can contain connecting ribs 12 located on the bottom side of each upright wall 3. The wall edges 6, 6' are bevelled in order to permit good attachment of the walls 3 at the corners of the mold 1 preferably by welding together the upright walls 3. The use of separate upstanding walls to be heatsealed to each other is advantageous in that only flat wall parts have to be injection molded, thereby avoiding the application of complicated injection molding devices. Moreover, walls 3 of appropriate size may be separated from an injection molded part of greater size.

Alternatively, the walls 3 may be screwed together and also screwed to the bottom 2.

The upright walls 3 are provided with drainage holes in the form of drainage slits 4 during the injection molding of the walls 3. In order to ensure that, after injection molding of the cheese mold in a molding device 13, the molding device, slit-shaping parts 14 can be removed easily from the finished wall 3, the drainage slits 4 and the mold slit-shaping parts 14 diverge to the outside of the wall 3.

The drainage slits 4 are disposed in rows 19 running in the lengthwise direction of the wall 3. The drainage slits 4 of one row are staggered relative to the row above.

As seen in FIG. 2, in order to obtain a cheese mold which is resistant to the great forces being exerted during pressing of the curd to a cheese the walls 3 are provided on the outerside thereof with reinforcement ribs 7 extending both at right angles and parallel to the circumference of the mold 1. For this, the injection molding device 13 is provided with molding blocks 15 which are integral with the molding slit-shaping parts 14.

Figure 6:
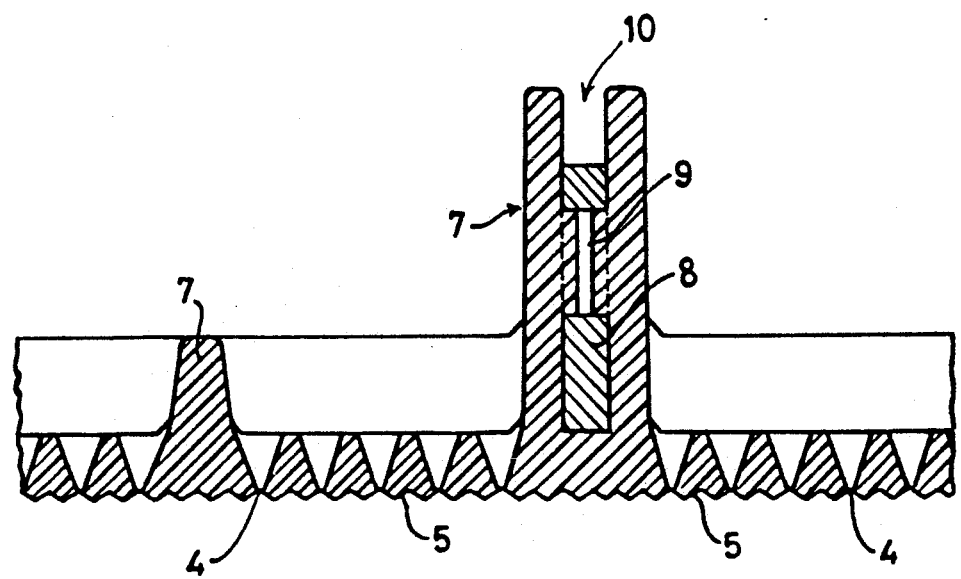
FIG. 6 is a part of a longitudinal section of an upright wall of a cheese mold provided with a metal reinforcement strip.
Figure 4:
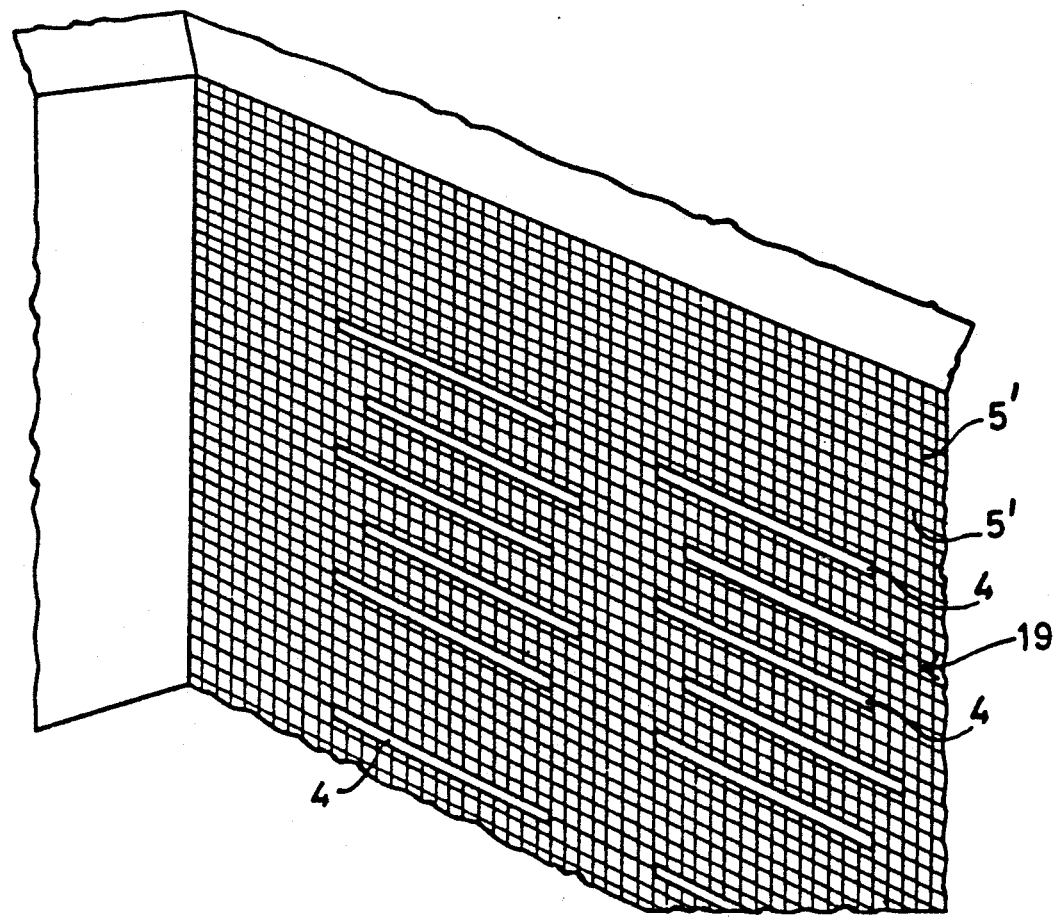
FIG. 4 is a part of a longitudinal section of an upright wall of a cheese mold according to the invention.

As seen in FIG. 6, for further reinforcement, the reinforcement rib 7 may have a recess 10 in which a metal reinforcement strip 8, can be fitted after removal of the wall 3 from the injection molding device 13. The reinforcement strip 8 may have through-holes 9 for anchoring the strip 8 to the wall 3. The recess 10 thereafter will cause the plastic of the wall to flow through the holes 9 of the metal reinforcement strip 8.

In a convenient embodiment the cheese mould is reinforced by surrounding same with a metal reinforcing frame, such as formed by interconnected metal strips.

In case of surrounding reinforcements it is even possible not to interconnect the walls of the cheese mold by heat sealing and to leave the walls loose with respect to each other.

The inside of each upright walls is expediently provided with whey discharge recesses 5 which are formed during the injection moulding, and which open out into drainage slits 4.

Figure 5:
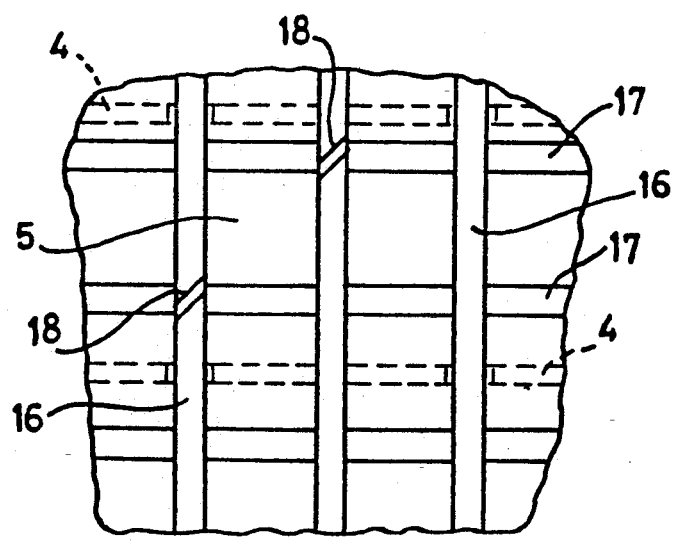
FIG. 5 is a detail of the wall of whey discharge recesses which form a cheese net structure formed by injection molding.
Figure 3A:
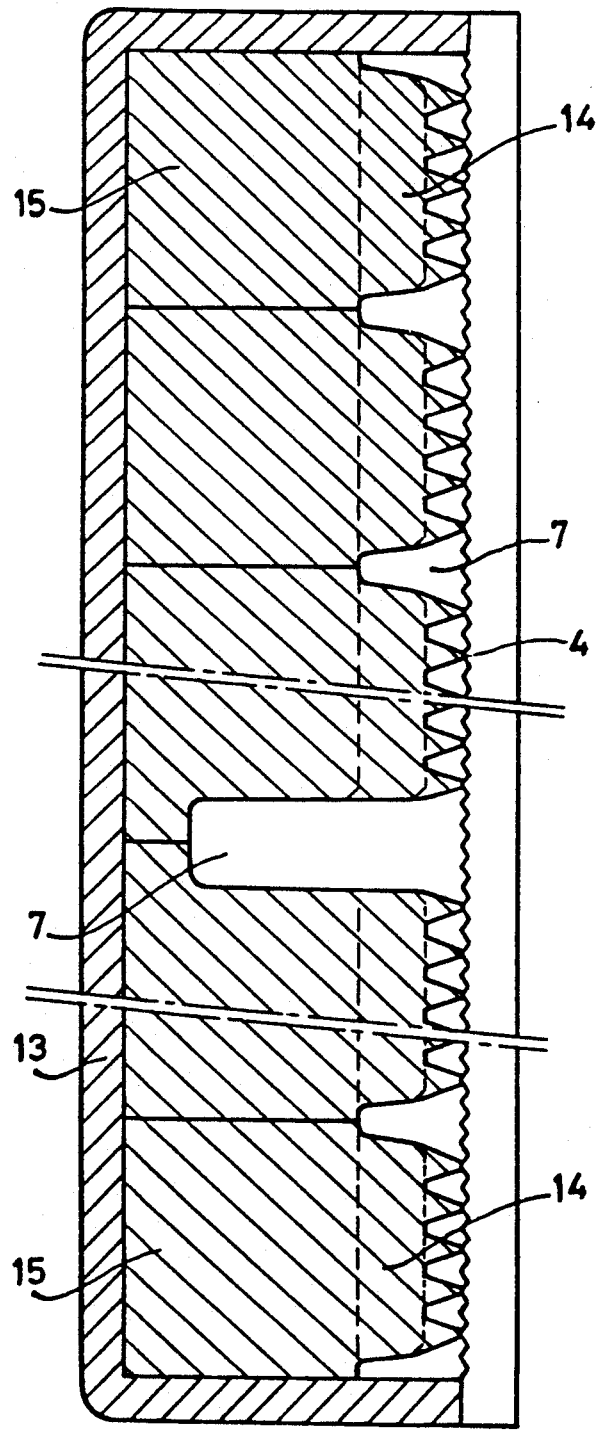
FIG. 3a is a cross-section of an injection mold in which an upright wall of a cheese mold according to FIG. 1 is formed.

As seen in FIG. 3, on the innerside of wall 3 an integral net structure 5' of wall 3 an integral net structure 5' is formed by injection molding. As seen in FIG. 5, the net structure 5' is formed by first structure ribs 16 running in the vertical direction of the upright walls 3 and second structure ribs 17 running in the lengthwise direction of the upright walls, so as to form therebetween the whey discharge recesses 5.

In certain cases it can be advisable during the injection molding to form additional channels 18 on the inner side of the wall which connect the whey discharge recesses 5, to facilitate flow of the whey during pressing.

In order to facilitate the removal of a pressed cheese from the cheese mold, the first structure ribs 16 are made thicker than the second structure ribs 17. At the points of intersection of the structure ribs the net structure 5' has the thickness of the first structure ribs 16.

Having, thus, described the invention, what is claimed is:

1. A substantially rigid plastic cheese mold which is a product of injection molding; comprising:
   (a) a bottom;
   (b) at least one upright wall extending upwardly from the bottom, the wall having an inner side and an outer side;
      (1) the wall having a plurality of drainage slits formed therethrough;
      (2) the inner side of the wall having a plurality of ribs extending inwardly thereon the ribs defining whey discharge recesses therebetween which open into the drainage slits;
      (3) the ribs having connecting channels formed therein to interconnect adjacent whey discharge recesses;
   the ribs, the drainage slits and the connecting channels all having been formed during the injection molding of the wall.

2. The cheese mold of claim 1, wherein the drainage slits diverge outwardly from the inner side to the outer side of the wall.

3. The cheese mold of claim 1, wherein the drainage slits diverge outwardly from the inner side to the outer side of the upright wall, the drainage slits being disposed in rows running in a lengthwise direction along the upright wall, the drainage slits of at least one row being staggered relative to the row above.

4. The cheese mold according to claim 1, further comprising a metal reinforcement strip having throughholes formed therethrough, the reinforcement strip being embedded in at least one rib.

5. A substantially rigid plastic cheese mold, comprising:
   at least one substantially rigid injection molded plastic wall which has an inner side and an outer side, the wall having drainage holes formed therethrough, the inner side of the wall defining a net structure which comprises a plurality of vertical ribs (16) and additional channels (18) interconnecting whey discharge recesses located at different sides of the ribs (16) being present in the ribs,
   said whey discharge recesses (5) opening into said drainage slits and communicating therewith, said ribs and said drainage slits and said additional channels having been formed during injection moulding of the walls of the cheese mould so that the whey discharge recesses, drainage slits and additional channels have substantially smooth injection molded surfaces.

* * * * *